United States Patent
Ravi et al.

(10) Patent No.: US 11,625,719 B2
(45) Date of Patent: Apr. 11, 2023

(54) FRAMEWORK FREE INTEGRATION

(71) Applicant: Synchrony Bank, Stamford, CT (US)

(72) Inventors: Viveka Vardhan Ravi, Stamford, CT (US); Anil Kumar Mothea, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 17/357,035

(22) Filed: Jun. 24, 2021

(65) Prior Publication Data

US 2021/0406890 A1 Dec. 30, 2021

Related U.S. Application Data

(60) Provisional application No. 63/043,659, filed on Jun. 24, 2020.

(51) Int. Cl.
   - *G06F 15/173* (2006.01)
   - *G06Q 20/40* (2012.01)
   - *G06F 9/46* (2006.01)
   - *H04L 41/0873* (2022.01)

(52) U.S. Cl.
   CPC .......... *G06Q 20/401* (2013.01); *G06F 9/46* (2013.01); *H04L 41/0873* (2013.01)

(58) Field of Classification Search
   CPC ...... G06Q 20/401; G06Q 20/02; G06Q 20/12; G06Q 20/20; G06Q 20/385; G06Q 20/4016; G06F 9/46; H04L 41/0873; H04L 41/0823; H04L 41/082

See application file for complete search history.

(56) References Cited

U.S. PATENT DOCUMENTS

| 2014/0089185 A1* | 3/2014 | Desai ................ G06Q 20/3674 705/41 |
| 2019/0228461 A1* | 7/2019 | Domokos .......... G06Q 30/0201 |

FOREIGN PATENT DOCUMENTS

| CN | 111291418 A | * | 6/2020 | |
| EP | 3145159 A1 | * | 3/2017 | |
| WO | WO-2020155581 A | * | 8/2020 | .......... G06Q 20/065 |

* cited by examiner

*Primary Examiner* — Richard G Keehn
(74) *Attorney, Agent, or Firm* — Polsinelli LLP

(57) ABSTRACT

Examples describe data security and routines structured to avoid conflicts. One example includes accessing data for a merchant website including a framework with a first routine for a function, and accessing an account security element for the merchant website with a second routine associated with an account security system for the function. The second routine is optimized to avoid conflicts with the first routine. The framework is automatically updated while the second routine is maintained with no changes. The merchant website data is then transmitted with the updated first routine and the account security element with the second routine, where the updated first routine and the second routine facilitate data security on the client device without framework conflicts when the updated first routine for the function and the second routine for the function operate concurrently on the client device.

21 Claims, 10 Drawing Sheets

800

```
┌─────────────────────────────────────────────────────────────────────┐
│ ACCESSING, BY A MERCHANT SYSTEM COMPRISING ONE OR MORE PROCESSORS,  │
│ MERCHANT WEBSITE DATA FOR A MERCHANT WEBSITE INCLUDING A FRAMEWORK, │
│ AND WHEREIN THE FRAMEWORK INCLUDES A FIRST ROUTINE FOR A FUNCTION   │
│                                 805                                 │
└─────────────────────────────────────────────────────────────────────┘
                                    ↓
┌─────────────────────────────────────────────────────────────────────┐
│ ACCESSING AN ACCOUNT SECURITY ELEMENT FOR THE MERCHANT WEBSITE,     │
│ WHEREIN THE ACCOUNT SECURITY ELEMENT INCLUDES A SECOND ROUTINE      │
│ ASSOCIATED WITH AN ACCOUNT SECURITY SYSTEM FOR THE FUNCTION, AND    │
│ WHEREIN THE SECOND ROUTINE IS OPTIMIZED TO AVOID CONFLICTS WITH THE │
│ FIRST ROUTINE WHEN A USER INTERFACE CONNECTED WITH THE MERCHANT     │
│ SYSTEM IS OPERATING ON A CLIENT DEVICE CONCURRENTLY WHEN THE SECOND │
│ ROUTINE IS OPERATING AS PART OF A CONNECTION FOR THE CLIENT DEVICE  │
│ WITH THE ACCOUNT SECURITY SYSTEM                                    │
│                                 810                                 │
└─────────────────────────────────────────────────────────────────────┘
                                    ↓
┌─────────────────────────────────────────────────────────────────────┐
│ AUTOMATICALLY UPDATING THE FRAMEWORK TO AN UPDATED FRAMEWORK,       │
│ WHEREIN THE UPDATED FRAMEWORK INCLUDES AN UPDATED FIRST ROUTINE     │
│ FOR THE FUNCTION                                                    │
│                                 815                                 │
└─────────────────────────────────────────────────────────────────────┘
                                    ↓
┌─────────────────────────────────────────────────────────────────────┐
│ MAINTAINING THE SECOND ROUTINE FOR THE FUNCTION WITH NO CHANGES TO  │
│ THE SECOND ROUTINE                                                  │
│                                 820                                 │
└─────────────────────────────────────────────────────────────────────┘
                                    ↓
┌─────────────────────────────────────────────────────────────────────┐
│ MAINTAINING THE SECOND ROUTINE FOR THE FUNCTION WITH NO CHANGES TO  │
│ THE SECOND ROUTINE; AND                                             │
│                                 825                                 │
└─────────────────────────────────────────────────────────────────────┘
                                    ↓
┌─────────────────────────────────────────────────────────────────────┐
│ TRANSMITTING THE MERCHANT WEBSITE DATA WITH THE UPDATED FIRST       │
│ ROUTINE AND THE ACCOUNT SECURITY ELEMENT WITH THE SECOND ROUTINE,   │
│ WHEREIN THE UPDATED FIRST ROUTINE AND THE SECOND ROUTINE FACILITATE │
│ DATA SECURITY ON THE CLIENT DEVICE WITHOUT FRAMEWORK CONFLICTS WHEN │
│ THE UPDATED FIRST ROUTINE FOR THE FUNCTION AND THE SECOND ROUTINE   │
│ FOR THE FUNCTION OPERATE CONCURRENTLY ON THE CLIENT DEVICE          │
│                                 830                                 │
└─────────────────────────────────────────────────────────────────────┘
```

FIGURE 8

900 

```
┌─────────────────────────────────────────────────────────────────────┐
│ RECEIVING WEBSITE DATA INCLUDING A FRAMEWORK AND AN ACCOUNT SECURITY│
│ ELEMENT FOR A MERCHANT WEBSITE, WHEREIN THE FRAMEWORK INCLUDES A    │
│ FIRST ROUTINE ASSOCIATED WITH A MERCHANT SYSTEM FOR A FUNCTION, AND │
│ WHEREIN THE ACCOUNT SECURITY ELEMENT INCLUDES A SECOND ROUTINE      │
│ ASSOCIATED WITH AN ACCOUNT SECURITY SYSTEM FOR THE FUNCTION         │
│                                 905                                 │
└─────────────────────────────────────────────────────────────────────┘
                                   ↓
┌─────────────────────────────────────────────────────────────────────┐
│ GENERATING A USER INTERFACE FOR THE MERCHANT WEBSITE USING THE      │
│ FIRST ROUTINE;                                                      │
│                                 910                                 │
└─────────────────────────────────────────────────────────────────────┘
                                   ↓
┌─────────────────────────────────────────────────────────────────────┐
│ RECEIVING INPUT CORRESPONDING TO A SELECTION OF THE ACCOUNT         │
│ SECURITY ELEMENT OF THE USER INTERFACE, WHEREIN THE ACCOUNT         │
│ SECURITY ELEMENT IS ASSOCIATED WITH THE ACCOUNT SECURITY SYSTEM     │
│                                 915                                 │
└─────────────────────────────────────────────────────────────────────┘
                                   ↓
┌─────────────────────────────────────────────────────────────────────┐
│ GENERATING A MODAL, WHEREIN THE MODAL IS GENERATED IN RESPONSE TO   │
│ THE INPUT, AND WHEREIN THE MODAL FACILITATES ESTABLISHING A SECURE  │
│ CONNECTION WITH THE ACCOUNT SECURITY SYSTEM;                        │
│                                 920                                 │
└─────────────────────────────────────────────────────────────────────┘
                                   ↓
┌─────────────────────────────────────────────────────────────────────┐
│ TRANSMITTING POSTBACK DATA USING THE FIRST ROUTINE FOR THE FUNCTION,│
│ WHEREIN THE POSTBACK DATA IS STORED BY THE MERCHANT SYSTEM AS PART  │
│ OF THE MERCHANT WEBSITE                                             │
│                                 925                                 │
└─────────────────────────────────────────────────────────────────────┘
                                   ↓
┌─────────────────────────────────────────────────────────────────────┐
│ ESTABLISHING A SECURE COMMUNICATION CHANNEL WITH THE ACCOUNT        │
│ SECURITY SYSTEM USING THE SECOND ROUTINE FOR THE FUNCTION, WHEREIN  │
│ THE SECURE COMMUNICATION CHANNEL FACILITATES DATA SECURITY FOR      │
│ CLIENT DATA AS PART OF A SECURE TRANSACTION                         │
│                                 930                                 │
└─────────────────────────────────────────────────────────────────────┘
```

FIGURE 9

FRAMEWORK FREE INTEGRATION

CROSS REFERENCE TO RELATED APPLICATIONS

This application claims priority to U.S. Provisional Application 63/043,659, filed on Jun. 24, 2020, the entire content of which is incorporated herein by reference.

FIELD

The present disclosure relates generally to data security and transactions, as well as integration of duplicated routines from framework and framework free sources. In one example, the systems and methods described herein may be used to implement data security and facilitate transaction authorization and settlement in a variety of transactional contexts, and particularly modular integration of data security in transaction websites.

BACKGROUND

Clients often seek to obtain and use credit from a lending institution for a variety of purposes. In some circumstances, a client may interact with a merchant in an environment where the client does not have access to the client's account number, or where the client prefers additional security and protection for the client's data. Additionally, in some circumstances, a client may interact with a single entity to make a single payment to multiple different merchants. Managing a transaction in such environments can create barriers to completing transactions between clients, merchants, and lenders. Additionally, other considerations can be involved in such transactions, such as lender and merchant concerns related to fraud, and regulatory controls on data sharing when the data used in such transactions can be subject to a variety of privacy and regulatory considerations. Such considerations can further create barriers in the context of network communications and data management in a communication system for the data used to facilitate credit options and associated purchase transactions.

SUMMARY

Disclosed examples may provide systems to prevent conflicts between portions of a system that are part of a transaction (e.g. a merchant website) with systems that enable data security for the transaction (e.g. an independent account security system). Websites can use frameworks (e.g. JavaScript frameworks) to simplify and standardize design. When a website integrates independent or third party systems, such as transaction or account security systems, duplicated use of a common framework can result in conflicts. Conflicts can occur when different versions of the same framework are present, or when calls to a framework are not structured to avoid conflicts between different systems. Managing such conflicts can result in significant time delays in providing improved services or updates to a website, particularly when data security and payment transactions are involved. Even when active attempts to avoid conflicts are present, updates to frameworks and complex interactions between frameworks can result in issues such as styling components being broken, and other functionality supported by common frameworks behaving unexpectedly due to complex interactions that can occur when different systems integrate a framework, or different versions of a framework, using different implementations.

Examples described herein include account security systems implemented without frameworks (e.g. framework free) to prevent conflicts with common frameworks in transaction websites that the account security systems are designed to supplement and interact with. Some examples can implement separate name spaced styling attribute libraries to avoid framework conflicts and to prevent merchant website styling components from being broken when account security systems are added to a website.

Examples can allow a merchant website to use framework systems with given functions, while similar functions are implemented outside of a framework as part of an account security system, with the framework free account security system structured to avoid conflicts between the same function being implemented on the website (e.g. functions using a framework) and in account security systems integrated with the website (e.g. framework free functions).

One example is a method performed by a merchant system to implement functions without framework conflicts as described above. The method includes accessing merchant website data for a merchant website including a framework, and where the framework includes a first routine for a function. The method also involves accessing an account security element for the merchant website, where the account security element includes a second routine associated with an account security system for the function, and where the second routine is optimized to avoid conflicts with the first routine when a user interface connected with the merchant system is operating on a client device concurrently when the second routine is operating to connect the client device with the account security system. In some examples, the framework is automatically updated with updated first routine for the function while the second routine for the function with no changes to the second routine. This can avoid conflicts that occur when a framework is updated but independent systems (e.g. a merchant website and an account security system) are not coordinated to avoid conflicts when such an update occurs. The method can then include transmitting the merchant website data with the updated first routine and the account security element with the second routine. The updated first routine and the second routine then facilitate data security on the client device without framework conflicts when the updated first routine for the function and the second routine for the function operate concurrently on the client device. Such examples can be configured with no framework structures in the system, or with some framework structures for other system operations, but no framework structures for the operations described above. Some examples can thus operate where the operations are configured without framework structures. Other examples are configured with frameworks designed to avoid error causing conflicts.

Another example can include systems and methods performed by a client device to avoid such conflicts around frameworks as described above. The example method includes receiving website data including a framework and an account security element for a merchant website, where the framework includes a first routine associated with a merchant system for a function, and where the account security element includes a second routine associated with an account security system for the function. A user interface for the merchant website using the first routine on the client device. An input corresponding to a selection of the account security element of the user interface is then received, where the account security element is associated with the account security system, and is used to generate a modal as part of establishing a secure connection with an account security system. Postback data is transmitted using the first routine for the function, where the postback data is stored by the merchant system as part of the merchant website. The secure communication channel is also established with the account security system using the second routine for the function, where the secure communication channel facilitates data security for client data as part of a secure transaction. The framework and the non-framework routines can be used for the same function as part of secure transaction operations with the website and the account security system, while avoiding conflicts as the functions are implemented by separate routines which could have conflicts if both routines invoke the same framework.

Examples allow organizations to provide efficient transactions in a secure network. One implementation can involve an account security system receiving a checkout communication associated with a secure transaction, where the checkout communication is structured to include a first child merchant identifier associated with a first child merchant system, a second child merchant identifier associated with a second child merchant system, and a merchant identifier associated with a merchant system. The merchant identifier can be associated with the first child merchant identifier and the second child merchant identifier. In such an implementation, the first child merchant system and the second child merchant system are associated with different merchants. The merchant system can then be authenticated using the merchant identifier. The secure transaction can then proceed with facilitating processing of a first payment of the secure transaction, where processing is facilitated using the first child merchant identifier, and where processing is based on the authentication of the merchant system. A second payment can also be performed concurrently or after the first payment. The secure transaction can thus include facilitating processing of a second payment of the secure transaction, where processing is facilitated using the second child merchant identifier, and where processing is based on the authentication of the merchant system. The associated operations can occur in real-time (e.g., occurring immediately or nearly immediately within the context of communications that occur over a fixed amount of time, such as within 1 second) during a transaction to add security to transactions and associated real-time communications. Examples described herein improve the operation of devices and networks with improved security and privacy that can be added to existing devices and networks in real-time secure communication environments.

Some examples include structures to implement data security for client data used as part of a network transaction, and to manage merchant access to tokenized client data that protects client data security while facilitating transactions. In some merchant systems, for example, an independent structure for transaction authorization can be implemented, where a merchant may want to also offer secure validation of client accounts. Examples described herein include systems and methods that allow account number lookup and account number validation to be enabled within a merchant system while protecting client data from the merchant system. These data lookup operations can be done with a security system that validates the merchant system, and then interacts with a client system to perform lookup or validation for client data while maintaining client data security.

In one example, a data security system can be invoked via an interface element included in a merchant user interface. Selection of the interface element can be used as part of a secure transaction to allow a client to perform an account lookup operation or an account validation operation. In some such examples, selection of the associated interface element by a client device interacting with a merchant website causes a checkout communication to be initiated by a merchant system. When the checkout communication is received at an account security system that will facilitate the account lookup or verification as part of the secure transaction, the account security system initially uses the checkout communication to authenticate the merchant system (e.g. confirming that the checkout communication is from a validated checkout system).

The data security system can then generate a client token for the merchant system that can be sent to the client device to confirm that the merchant system has been validated. The client device can then open a modal (e.g. an interface overlay on top of the merchant website interface) that is used for a communication channel with the account security system. This modal allows the merchant website to maintain a consistent look, feel, and interface flow while isolating the merchant system from sensitive client data. The communication channel between the client device and the account security system can be used to transmit identifying client information to the account security system, so that the account security system can provide information for the secure transaction. Account security can include account lookup information, such as providing an account number to a client. Account security can also include account verification, including verifying an account number and providing account details such as an available balance. This account data can then be tokenized to provide security and to isolate the merchant system from the actual data. When the client device is done communicating with the account security system, the tokenized data is then available to be provided to a merchant system if requested by the merchant system for use in completing a secure transaction.

Such examples can be implemented with various methods in an account security system. In some examples, the account security system can perform additional operations including receiving a checkout communication associated with a secure transaction. As described above, an account security system can function where the checkout includes data describing a validated checkout system, and where, when the checkout communication is received from a merchant system, the checkout communication does not include client information. The account security system can then process the checkout communication to authenticate that the checkout communication is from the validated checkout system, and generate a client token in response to an authentication that the checkout communication is from the validated checkout system. The client token can then be transmitted, so that when the client token is received at the client device, the client token is used to verify the merchant system. The account security system then receives an account communication including the client token and client information (e.g. where the client information is not received from the merchant system), and generates a tokenized client account number in response to the account communication. The tokenized client account number is then transmitted for use in facilitating the secure transaction, where the tokenized client account number allows the merchant system to process the secure transaction without access to the client information. The tokenized client account number can be automatically generated in real-time or near real-time, and such automatic operations can be performed thousands of times per second or more in accordance with examples described herein. Similarly, data for thousands or tens of thousands of transactions can be stored in a memory or associated database of a device to be available for real-time access during secure transactions as described herein.

Additional examples or variations can include further security operations to confirm the security of a client device, and to enable interactions with other systems as part of a secure transaction. The examples described above improve the operation of transaction communications systems and devices in such communication systems by improving device security and security of sensitive data within such devices and systems. Additionally, interfaces described herein improve both the operation of devices displaying such interfaces and communication systems used by such devices by improving the operation flow and reducing the number of user actions to perform operations as part of a secure transaction, as well as by enabling new functionality in system devices.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

The present disclosure is described in conjunction with the appended figures:

FIG. 8 is a flow diagram illustrating a method in accordance with some examples.

FIG. 9 is a flow diagram illustrating a method in accordance with some examples.

Figure 1:
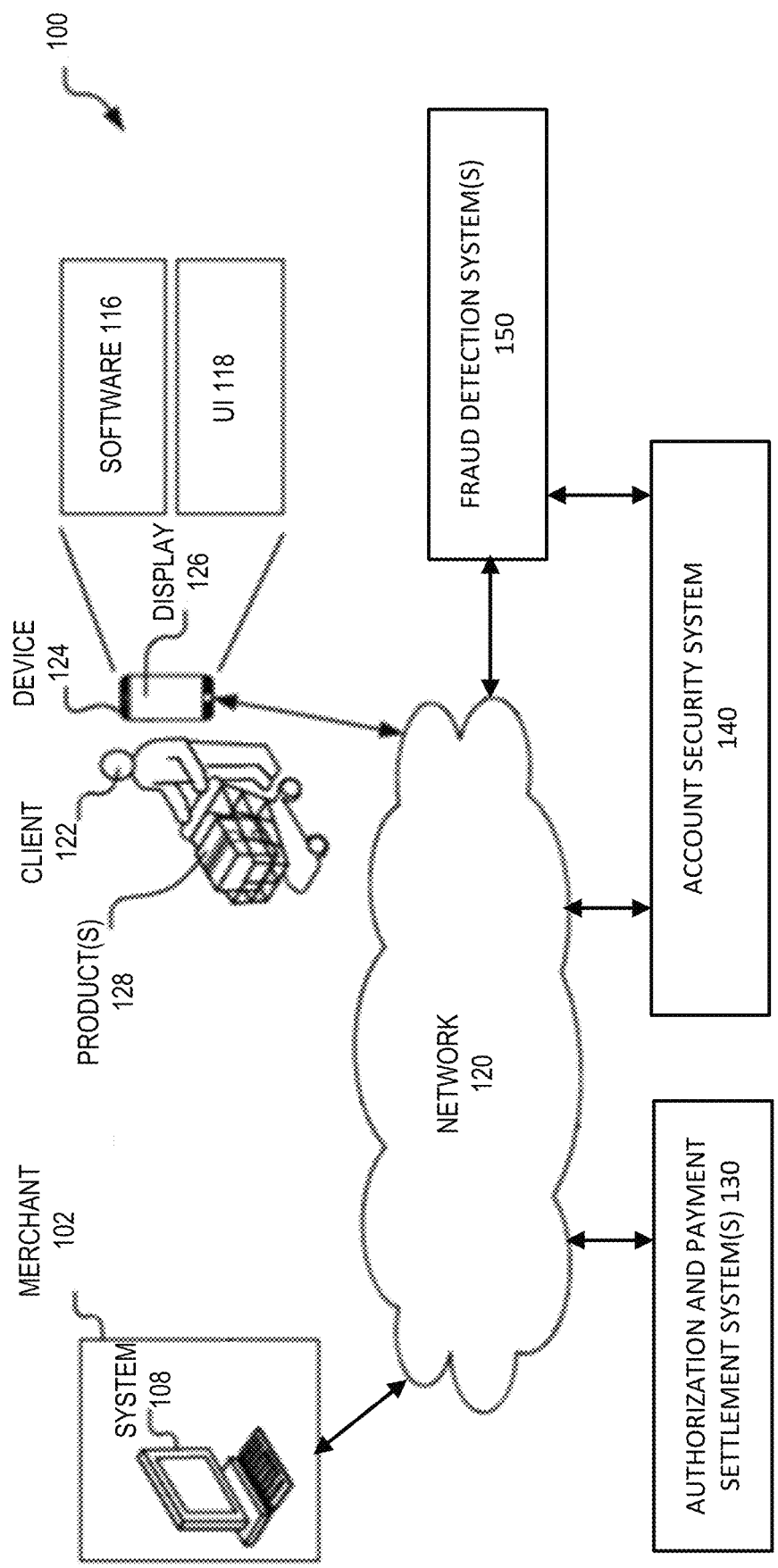
FIG. 1 depicts aspects of a system that can be used for data security and transaction management in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for the described implementations. In the following description, for the purposes of explanation, specific details are set forth in order to provide a thorough understanding of certain inventive embodiments. It is understood that various changes can be made in the function and arrangement of elements without departing from the spirit and scope as set forth in the appended claims. Additionally, it will be apparent that various embodiments may be practiced without these specific details. The figures and description are not intended to be restrictive.

In some transaction environments, in order to keep sensitive client data separate from merchant systems, aspects of a transaction system (e.g. a merchant website) can be structured using separate account security systems. While using such separate systems allows improved data security, overhead and potential unexpected conflicts can arise in such systems. Examples described herein improve the operation of such systems by reducing the overhead of maintaining multiple frameworks, as well as enabling functionality for both website and data security aspects of such a system with reduced conflicts when similar functions are used. Examples can simplify modular integration of existing websites with independent account security systems, reducing implementation times while providing data security and limiting conflicts and errors from addition of the modular data security. This can improve the performance of transaction networks and devices in such a network by improving security, while limiting possible errors and system failures from the improved security.

Some previous systems, for example, would implement JavaScript frameworks for both a merchant (e.g. website) portion of a system, as well as for the account security portions of such a system. While the use of such JavaScript frameworks can simplify development of these different aspects of a system, maintaining multiple implementations of such JavaScript frameworks increases overhead and can result in conflicts. Such conflicts can occur as updates to one framework interfere with the other framework, or when routines implemented with the expectation of one framework unexpectedly conflict or create errors given the presence of the second framework. Examples described herein improve the operations of such systems by reducing the extra overhead of maintaining or adding multiple frameworks, as well as the complexities of managing dependencies when duplicate frameworks are integrated in a system.

Such improvements, can, in some examples, operate in a modular website environment. This modular function can be implemented with a checkout button associated with an account security system to be added to a website. This button allows an interface for account lookup and verification to facilitate custom payment solutions selected by a merchant. The button is provided to client devices as part of a web page user interface from a merchant system. When a client interacting with a merchant website clicks the described modular button, various operations for account security are initiated. The merchant system responds to this selection by communicating with an account security system to authenticate the merchant system. The account security system can then return a client token and postback identifier if the merchant is authenticated. This response information can be used to initiate a modal on the client's device as part of the merchant website user interface. The modal can appear as integrated with the merchant website, but rather than using the existing channel between the client device and the merchant system, the modal uses a separate communication channel between the client device and the account security system. This channel allows the client to provide sensitive client information as part of client verification or account access (e.g. for account lookup or account verification operations). The account security system can then generate tokenized client data for use with the merchant. The tokenized client data keeps the regular client data secure and separate from the merchant system, while allowing the merchant system to perform operations for a secure transaction, so that the merchant can receive payment while only having access to secure (e.g. tokenized) client data that does not put the client's sensitive information at risk.

In such a context, examples described herein can implement certain functions for a website using frameworks, while implementing similar or identical functions for account security in a framework free structure. While previous systems could implement account security using a certain framework to simplify the account security implementation, integration of such a framework dependent account security implementation would require a merchant website to manage integration that could conflict with an existing implementation of the same framework or a similar framework. By structuring the modular account security addition in a framework free structure, the integration can avoid such conflicts. For example, the modal described above, when implemented with framework specific styling attributes, can break framework styling attributes in a website that the modal is integrated with. Examples implemented with framework free name spaced styling attribute libraries improve the integration and operation of devices by eliminating errors that occur on a device when the framework styling attributes break (e.g. do not function properly on a device).

In addition to the operations described above, the initial modal and channel between the client device and the account security system can be initiated, in some examples, only after the client device has been determined to be secure (e.g. using a security analysis of the device). Additionally, other examples can add additional security operations, or can perform different operations for any number of accounts associated with clients. As the account security system is modular and independent of other operations for a secure transaction, after the account validation is performed and the tokenized client data is generated, the merchant device can interact with separate independent systems to finalize and settle the secure transaction. In various examples, the account security system may communicate with such independent systems to facilitate the use of the tokenized data. Details of selected examples are below, though it will be apparent that additional implementations are possible other than the specific examples provided.

FIG. 1 is a block diagram of a payment communication network 100 in which network data management and security for transactions is implemented in accordance with some examples. The example payment communication network 100 includes a merchant 102 implementing a merchant system 108, which can be one or more networked computing devices that can be networked. Merchant system 108 can include any number of devices (e.g. a checkout register, point of sale (POS) devices, or any other such device) as well as server systems and computers that implement a website that can be used to perform secure transactions over a network 120. The merchant system 108 and associated website can be implemented as a computing device with architecture 1000 described below and illustrated in FIG. 10.

Referring to FIG. 1, the merchant system 108 is configured to perform operations associated with a purchase transaction for a client 122 and a product 128. In some examples, a client can use a client device 124 (e.g., a cellular telephone, laptop computer, a desktop computer, etc.) associated with a client account to interact with merchant system 108 as part of a secure transaction. Some examples of a client device 124 can include a display device 126 (e.g., a conventional touch screen) and wireless or wired network connections to network 120. The client device 124 includes software 116 that can additionally cause display of user interfaces 118 on display device 126 in accordance with various examples. This can include, as described herein, web browser software as part of software 116 that can display a user interface using data received from a website of merchant system 108.

A client 122 may select one or more products 128 for purchase via interface(s) of the merchant's website. When the client device 124 interacts with the merchant system 108 via a website interface, the merchant system 108 can use a payment channel based on the particular client device 124 and options selected by client 122.

The merchant system 108 generates and communicates an authorization request message with authorization and payment settlement system(s) 130 as part of a secure transaction. The authorization request message can be routed to an authorization system, with the authorization system 130 processing the authorization request message to generate an authorization response.

An authorization entity can operate one or more authorization computing devices as part of an authorization system 130 configured as part of a payment communication network 100. The authorization system 130 can include various sub-systems or component functions implemented on processors of the authorization system to enable authorization of payment transactions between client 122 and merchant 102. The authorization system 130 can include validation and fraud systems as well as a promotion system. These systems can be systems that operate in addition to similar systems of account security system 140 or independent fraud detection system 150. Validation and fraud systems of system 130 can include computing systems for validating card numbers from client device 124 to confirm that credit or payment funds are available to match the purchase amount associated with a transaction being authorized. Additional fraud analysis operations can analyze and process information associated with any aspect of a transaction to approve or deny an authorization request.

In addition to the systems described above, an authorization system can in various implementations, include additional systems for security, fraud detection, and other functionalities. Some implementations can include a token service that can act in a number of ways to facilitate secure communications between client 122 and various other services and devices, including retail merchant system 108 and other systems. Tokenization is a process of substituting sensitive data elements with non-sensitive equivalents (e.g. tokens). The token is a reference identifier that can be mapped to the sensitive data via token service. Such a token service can use large random number in combination with other systems, such as timing systems, to limit and secure the use of sensitive data being communicated over networks such as networks 120.

As described above, in some examples, authorization system 130 can be integrated with other systems, such as a credit issuing system and communication channels with a client 122 outside the authorization channels used to communicate authorization request messages and responses between merchant devices and devices of an authorization system (e.g. authorization system 130). In such a system various additional functionality can be integrated for security and payment systems improvements, such as the use of token services as described above. Additionally, while FIG. 1 illustrates communications between various systems and devices, including merchant system 108, client device 124, authorization system 130, account security system 140, fraud detection system 150, and network 120, in additional examples, other aspects of payment communication network 100 can further be altered or include additional or intervening elements, such as multiple clients, clients with shared accounts and devices, additional merchant or retailer systems, subsystems that can operate independently, additional communication channels, or other such structures.

Fraud detection system(s) 150 can include any independent service or system that can be used by account security system 140 or authorization system 130 to supplement or support fraud or security systems. For example, fraud detection system 150 can include systems for detecting if a computer of merchant system 108 or a user device 124 has been compromised by malicious software or other security risks. Fraud detection as described herein can include the use of independent data identifying such issues, as well as communications and analysis operations performed with such devices before they are allowed to participate in secure transactions with account security system 140 and/or authorization system 130. Additional examples can include other such security and fraud detection schemes to support the implementation of secure transactions as described herein. Additional details of an account security system 140 are described below, and in various examples, fraud detection system(s) 150 can be implemented with varying degrees of integration with an account security system 140.

Figure 2:
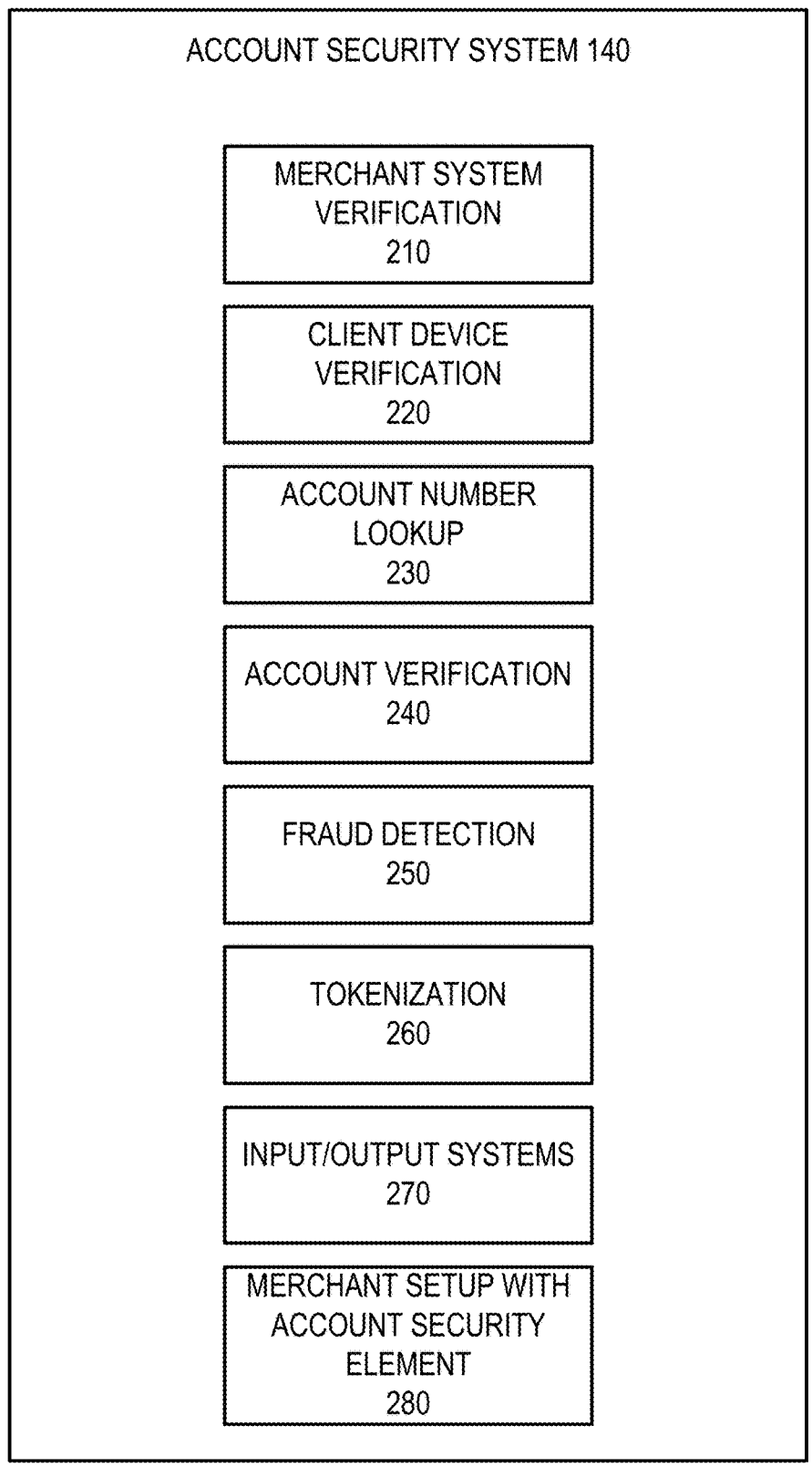
FIG. 2 depicts aspects of an account security system for implementing data security and transaction management in accordance with some examples.

FIG. 2 depicts aspects of an example account security system 140, which can be used within a payment communication network 100 or other systems to implement data security as described herein. Account security system includes a number of different elements that can be implemented as modules or different devices networked to implement various security functions. Account security system can be implemented as a single server, or as a distributed system using multiple networked devices. Input/output systems 270 can manage transmission of data and receipt of data both between different elements of the system 140 as well as with other devices, such as merchant servers and client devices, using any suitable network and communication components, such as those described below with respect to FIG. 10. The described elements of account security system 140 include merchant system verification 210, client device verification 220, account number lookup 230, account verification, fraud detection 250, and input/output systems 270. In other examples, these elements can be grouped in a variety of different ways. For example, client device verification 220 and fraud detection 250 can, in some examples, be structured as a single sub-system, or can be largely implemented as a separate system (e.g. using separate fraud detection system(s) 150). In various examples described below, the elements of account security system perform different parts of the operations to implement security as part of a secure transaction that uses modular elements to add to the security of larger systems.

Merchant system verification 210 interacts with merchant systems such as merchant system 108 to authenticate that the merchant is safe for a user to perform a transaction with. This verification can be done using security measures such as using security keys, transaction history data, merchant registration, and other verification tools. Merchant system verification 210 can create tokens that can be used as part of a secure transaction to allow participants in the transaction to confirm that they are interacting with verified participants that have met security standards and have access to the token generated by merchant system verification 210 for a specific transaction.

Client device verification 220 can include security operations to check for issues with a client's device, such as malicious software installed on a client device, a history of questionable transactions or fraud associated with a specific device, or other operations. This verification can be implemented via communication with a specific client device, accessing database data with fraud history data, or requiring installation of software on a client device to check for security issues with a client device. In some examples, merchant system verification 210 operations and client device verification 220 operations can be used as gateways for additional sub-systems, such that merchant systems and client devices are not allowed access or use of additional systems such as account number lookup 230 and account verification 240 unless the threshold requirements of merchant system verification 210 and client device verification 220 have been met.

Account number lookup 230 and account verification 240 interact with client devices to receive client data and access sensitive client account information. These operations can, for example, include receiving information such as an address, phone number, government identifier, or other such information, and using this information to access an account number associated with a client credit account. The client credit account number can then be provided to the client device or tokenization 260 element with an authorization to use the credit account with a specific secure transaction (e.g. a transaction associated with a client token generated by merchant system verification 210.) Similarly, account verification 240 can accept a client account number associated with the client credit account, and provide information such as an available balance to allow a client to confirm that the available balance is sufficient for a current secure transaction. The operations of account verification 240 and account number lookup 230 can be associated with a particular transaction, and used to trigger generation of tokenized client data by tokenization 260 element. This tokenization can involve generation of a one-time set of data that can be used only for a specific transaction. In some examples, after the tokenized client data is generated in response to account security system interacting with a client device, the tokenized client data is then stored until it is requested by the merchant system associated with the secure transaction, or until a deletion event occurs. Such deletion events can include a threshold amount of time, a number of incorrect requests for data associated with the client device or the client account, or other such events. If a deletion event occurs, a subsequent request for the data by the verified merchant can be met with a response indicating that the data has expired and the secure transaction is to be restarted (e.g. a new secure transaction initiated and the original transaction abandoned.)

Merchant setup with account security element 280 refers to systems used to integrate account security system 140 with associated merchant systems. This can include data intake and reporting systems, systems for confirming a particular website meets any limitations or technical requirements for accessing and integrating an account security system 140, and customization of an account security element to be used by a particular merchant website. Additional details for an example implementation of a merchant setup with account security element 280 module are described below with respect to FIG. 3.

Throughout operations for data security described herein, fraud detection 250 can monitor data and generate alerts or halt operations for a specific transaction when a risk of fraud is identified.

Figure 3:
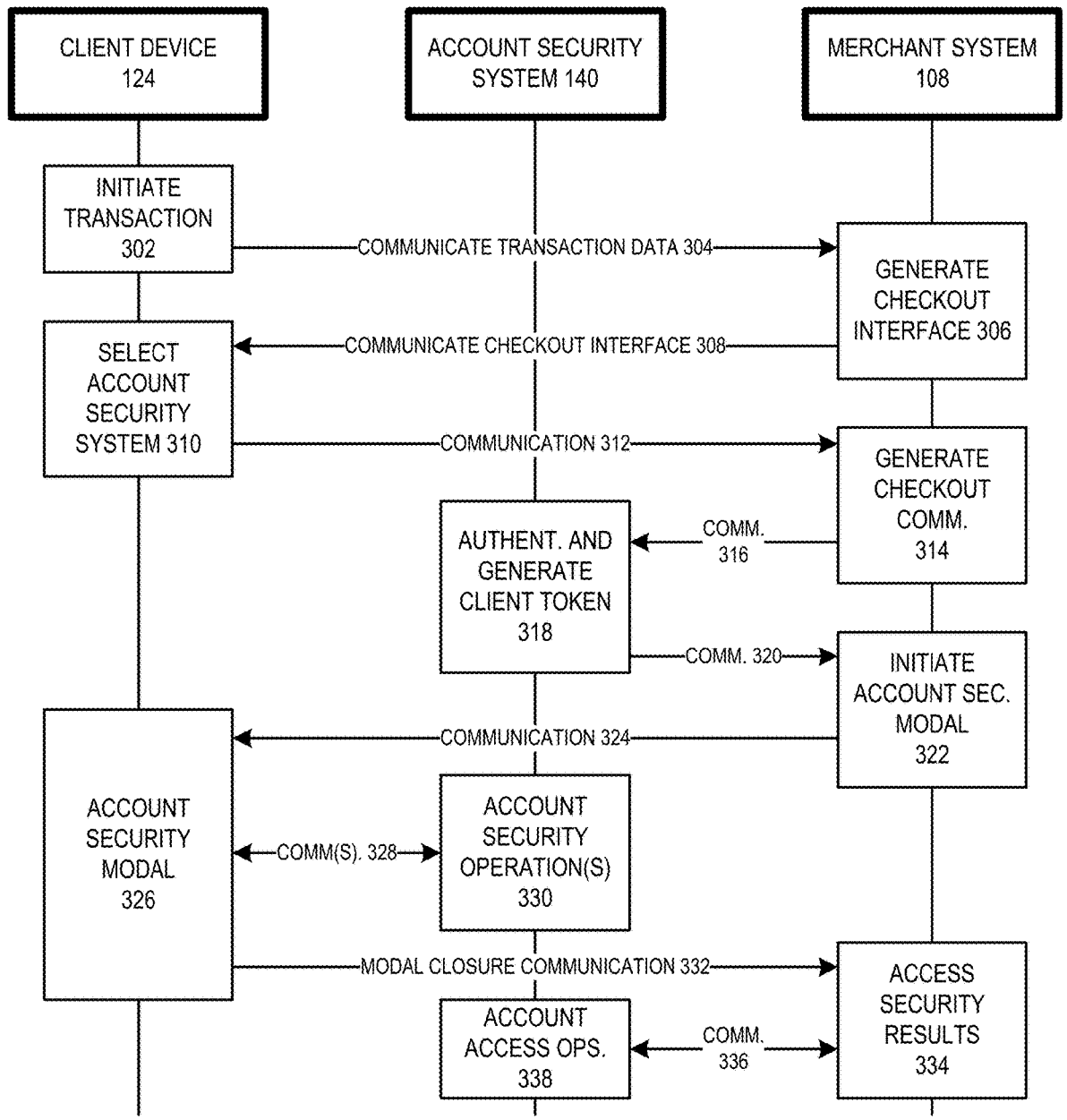
FIG. 3 depicts aspects of a system and system operations for data security and transaction management in accordance with some examples.
Figure 4:
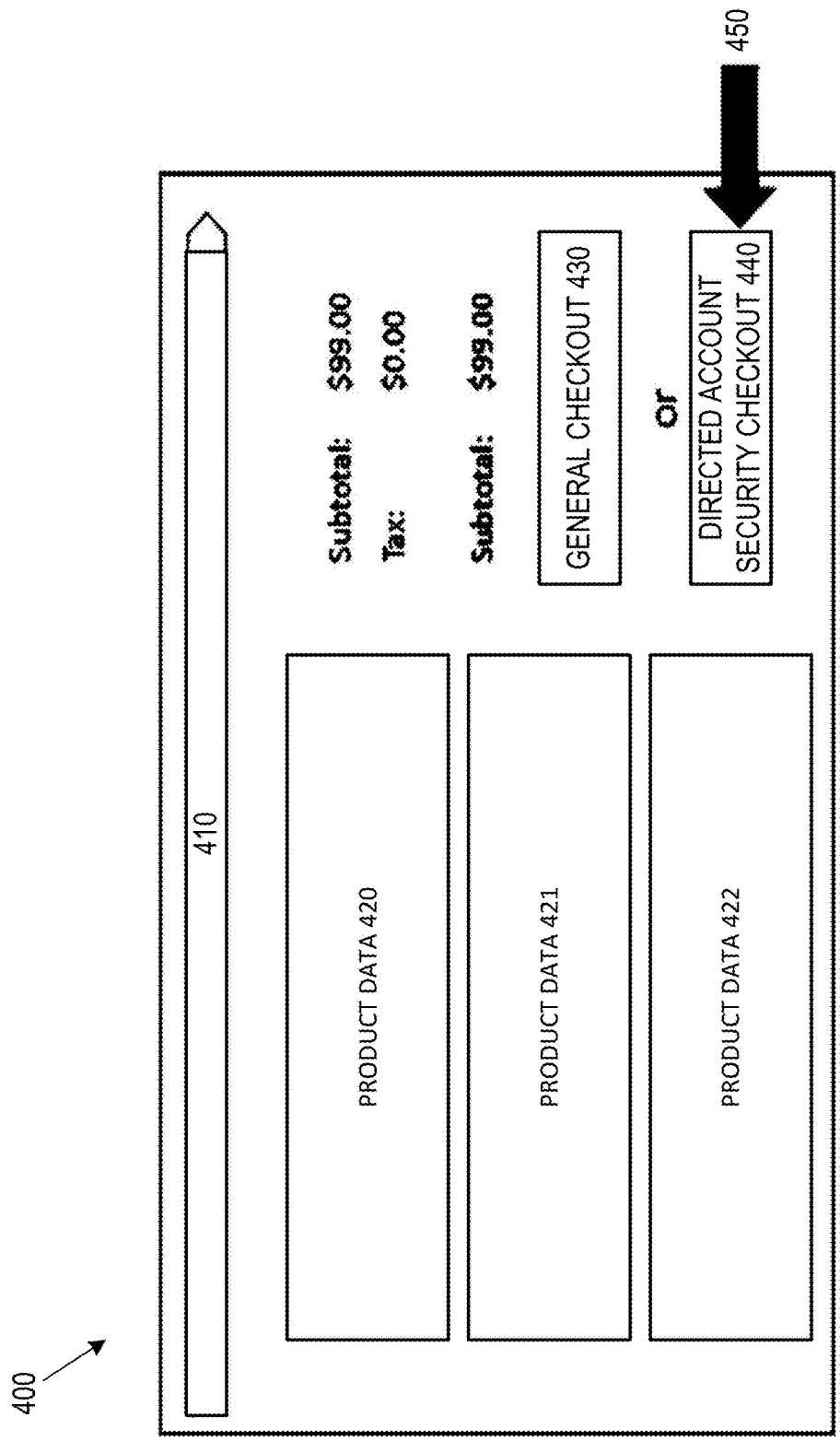
FIG. 4 depicts aspects of a system and user interfaces for data security and transaction management in accordance with some examples.
Figure 5:
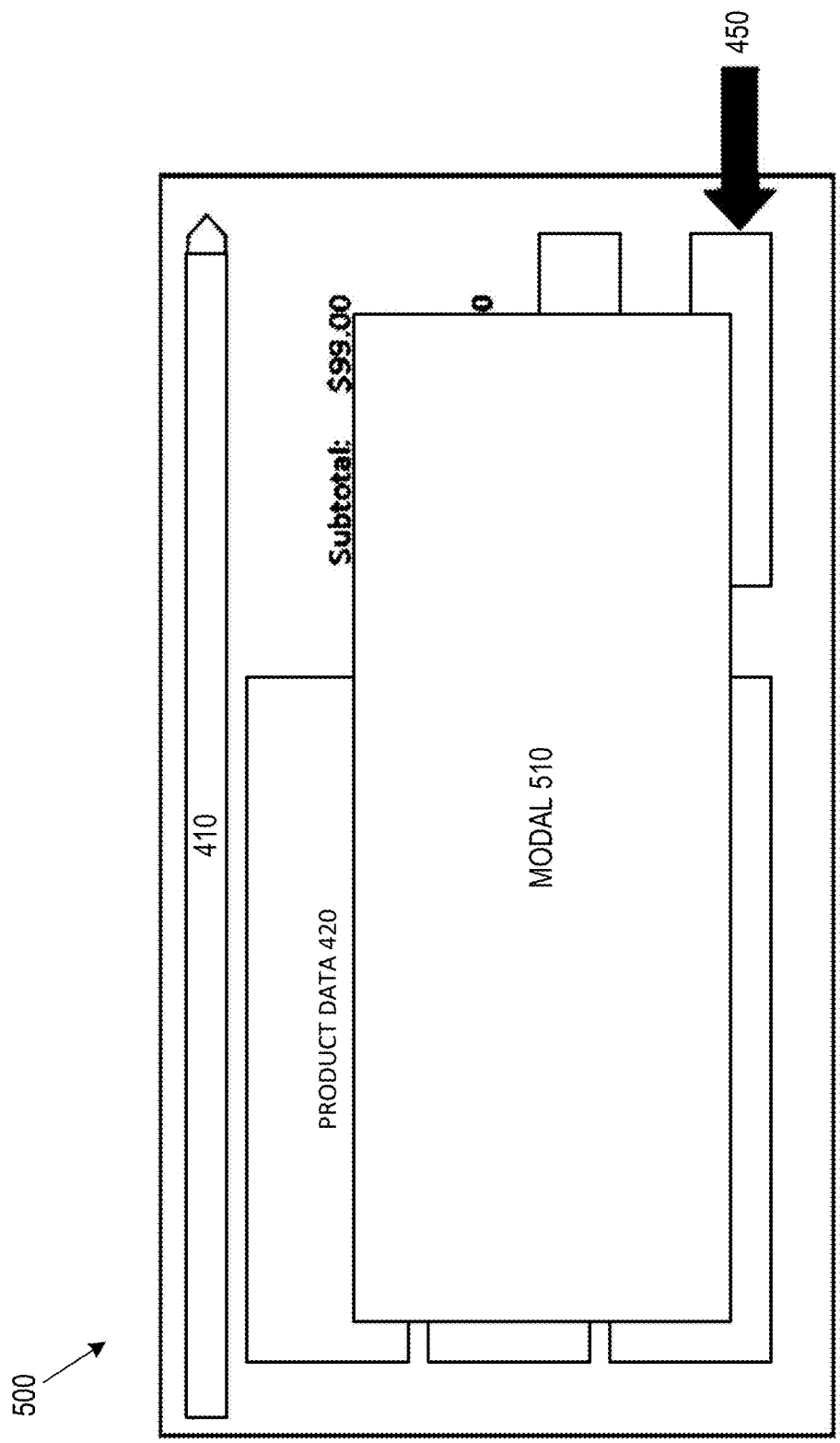
FIG. 5 depicts aspects of a system and user interfaces for data security and transaction management in accordance with some examples.

FIGS. 3-5 then describe an implementation of a secure transaction with data securing and a modular website implementation in accordance with some examples. FIGS. 4 and 5 illustrate aspects a modular website with an interface that can be displayed on a client device (e.g. client device 124) as part of data security operations for aspects of a secure transaction illustrated by FIG. 3.

FIG. 4 illustrates a user interface 400 with a transaction flow indicator 410, and product data 420, 421, and 422 for one or more products (e.g. product 128) that has been selected for purchase using a merchant website (e.g. as part of merchant system 108 of merchant 102). The user interface 400 includes a general checkout 430 interface element that can initiate payment operations using a general settlement system, or can used directed account security checkout 440 element. The directed account security checkout 440 interface element is a modular interface element that can be added to a website of a merchant in order to initiate data securing operations via an account security system in accordance with examples described herein. When a selection 450 of directed account security checkout 440 element occurs, a modal is launched to initiate a communication channel with an account security system (e.g. account security system 140), as illustrated by FIG. 5.

FIG. 5 shows a user interface 500 with modal 510 overlaying user interface 400. User interface 400 can be communicated to a client device from a merchant system, with various interactions with a merchant website leading to interface 400 being displayed on a screen of the user device. When selection 450 initiates modal 510, the modal 510 does not communicate via a merchant system, but establishes a communication channel with an account security system to keep sensitive client data separate from the merchant system. The modal 510 can then accept sensitive client data such as phone numbers, addresses, client identifiers, account numbers, and other such information. This information is kept separate from the merchant system, while the modal 510 allows modular integration of this independent data security structure (e.g. communications with data security system) within the context and user interface flow of the merchant website. Additional aspects of such interfaces are described below in the context of the examples shown in FIGS. 3 and 6.

FIG. 3 illustrates system operations and communications for data security as part of a secure transaction involving client device 124, account security system 140, and merchant system 108. In order for merchant system 108 to integrate account security system 140 into transactions involving merchant system 108 and customers of merchant system 108 (e.g. client device 124 using a merchant website of merchant system 108), merchant system 108 is configured with software elements to allow such integration. This can include a modular button integrated with a merchant website, and additional software elements included with a merchant website that enable a modal to be opened on client device 124 for a secure connection between client device 124 and account security system 140. This can also include additional software elements to allow account security system 140 to interact directly with account security system 140 (e.g. to access data, results of credit operations performed between client device 124 and account security system 140, etc.) Systems to manage this integration between account security system 140 and merchant system 108 can be structured as described above (e.g. as a merchant setup with account security element 280 for onboarding any merchant system with account security system 140).

Integration of a merchant website with account security system 140 can involve, in one example, integrating or accessing an account security element that can be structured as software instructions included with a merchant website. A client portion of this account security element can be transmitted to a client device such as client device 124 as part of a website for display on the client device. A merchant portion of the account security element can operate on a merchant system 108 to implement functionality for the merchant website. As described above, the merchant web site without the account security element can integrate a framework with associated routines to implement website functions. In some examples, this can be done with JavaScript frameworks, by including the framework in a website as follows:

<script src=https://www.example.com/accountsecuritysystem/js/framework1A.js></script>

Integration of such a framework (e.g. framework 1A) can simplify the merchant operations to structure the merchant web site. However, integration of the merchant web site with an account security system that uses frameworks can include the same framework, such that the merchant website using the above described account security modal then calls the same framework or a related framework to support the account security modal. An example integration of a framework dependent account security element can include multiple frameworks and the account security elements supported by the frameworks. An example of such integration in JavaScript can be structured as:

```
<script src=https://www.example.com/accountsecuritysystem/js/framework1B.js></script>
<script src=https://www.example.com/accountsecuritysystem/js/framework2B.js></script>
<script src=https://www.example.com/accountsecuritysystem/js/accountsecurityelement.js></script>
<link rel="stylesheet" href="https://www.example.dom/accountsecuritysystem/css/framework3.css">
```

This includes two independent JavaScript frameworks, a cascading style sheet, and the framework and style sheet dependent account security element JavaScript. The use of the same framework in both the initial merchant website (e.g. framework 1A) and the integrated support for the account security system (e.g. framework 1B) creates both redundant support for the framework overhead as well as possible conflicts as framework 1 is implemented in different versions or is updated. Additionally, integration of different versions during onboarding can require significant checks to confirm that the different versions of the framework are not creating conflicts that will result in errors during merchant website operation. Similarly, the use of a stylesheet (e.g. framework 3) supporting the accountsecurityelement.js can interfere with the initial merchant website creating interface display errors, communication errors, or other such errors to "break" the merchant website operation.

Instead of using multiple frameworks as part of account security system integration (e.g. with merchant setup with account security element 280), examples described herein integrate the functionality from the supporting frameworks (e.g. JavaScript and stylesheet framework 1B, framework 2B, and framework 3 above) into an account security element. The resulting JavaScript integration will replace the above JavaScript examples and the associated files with:
<script src=https://www.example.com/accountsecurity-system/js/frameworkfreeaccountsecurityelement.js></script>

This includes routines within the frameworkfreeaccountsecurityelement.js which include the functions from the previous frameworks without the conflicts with frameworks implemented in the initial merchant web site. By integrating such routines within the account security element to be used with the merchant website, overhead in supporting multiple instances of a framework are removed, and potential conflicts with associated merchant system errors are avoided. This improves the operation of the network (e.g. including client device 124, merchant system 108, and account security system 140 of FIG. 3) as well as the operation of the individual devices by removing redundant support for frameworks, preventing errors, and simplifying device setup. All of these improvements reduce processor and memory usage at the cost of increased complexity of the framework free account security element, resulting in an overall more efficient use of device resources while enabling account security features in the network using account security system 140. The operations below then describe how such a network can operate.

Prior to operation 302, the merchant system 108 is on boarded with account security system 140, and the merchant website integrates a framework free account security element from the account security system 140 (e.g. frameworkfreeaccountsecurityelement.js in the JavaScript example above). When client device 124 interacts with merchant system 108, the merchant system 108 sends website data to the client device 124 device, including a client portion of the account security element (e.g. including a modular button and additional routes for the modal and any other associated functions supporting account security system 140). A user of client device 124 selects items for a transaction as part of interactions with the website of merchant system 108.

In operation 302, client device selects products for purchase as part of a secure transaction, and initiates the secure transaction (e.g. via a process to checkout selection of a user interface). Communication 304 informs merchant system 108 of the client device 124 selection, and in response, merchant system generates a checkout interface (e.g. interface 400) in operation 306. The checkout interface includes a modular button, such as directed account security checkout 440 element of FIG. 4, and the data for the user interface is communicated from merchant system 108 to client device 124 in communication 308. In operation 310, the client device receives a selection for the account security system (e.g. selection 450), and this selection is communicated to merchant system 108 in communication 312.

The merchant system 108 receives an indication of the selection for the account security system in operation 314, and generates a checkout communication in operation 314, that is sent to account security system 140 in communication 316. In response to the checkout communication, account security system operation 318 authenticates merchant system 108 to confirm that the merchant system is secure and has been validated. The account security system generates a client token when the authentication is confirmed, and communicates the client token to merchant system 108 in communication 320. In some examples, the client token can be communicated with a postback identifier to allow tracking of the communications for the secure transaction, and to allow management of different transactions with different client devices and merchant systems that can continuously be interacting with account security system 140 to provide data security for secure transactions.

Merchant system 108 uses the client token from account security system to initiate the account security modal in operation 322 with communication 324, which can include the use of the client token in communication 324 that, when received by client device 124, allows the client device to perform security measures to confirm that merchant system 108 is a secure system and can safely perform the secure transaction. In operation 326, client device 124 opens a modal (e.g. modal 510 of user interface 500. From a client perspective, the modal opens in response to a user interface selection (e.g. selection 450), and appears as part of an interface for the merchant system 108 website. As described above, the modal opened in operation 326 is used with a communication channel established between client device 124 and account security system 140 for communications 328. Communications 328 for operations 326 and 330 can operate for various security operations, which can include operations to confirm that client device 124 is not presenting indications of a virus or security compromises, and can also include other fraud detection operations. Once such security operations are used as a gate to account access, the client device 124 can further provide sensitive client data to account security system 140 to perform operations in a secure environment as part of operations 326 and 330, including account number lookup and account verification operations. During the account security system 140 portion of these functions in operations 330, tokenized client data can be generated in response to data and interface selections provided via the modal on client device 124. The tokenized client data can be stored at account security system 140 until requested by the merchant system in operations 334. Communications between client device 124 and account security system 140 can occur in real-time or near real-time (e.g., as limited by processing speeds and latency in the devices and network) to provide a seamless user interface presentation as part of a transaction with merchant system 108.

The modal of operations 326 can, in some examples, close without the client device providing adequate information for the client to access account data or for tokenized client data to be generated. In such a circumstance, the client device can proceed with the transaction using a separate system (e.g.

returning to interface 400 and selecting the general checkout 430 user interface element). Data associated with this failure can be logged and used to check against future fraud indications.

When the modal does provide sufficient client data to account security system 140, closure of the modal on client device 124 can be considered the end of operations 326, and this closure can be communicated to merchant system 108 in communication 332. The closure causes merchant system 108 to request the security results from account security system in operation 334 using communications 336, which result in account security system responding with the tokenized client data in operations 338 and responsive communications 336.

In some examples, upon providing the tokenized client data, the independent modular data security operations provided by account security system 140 can be considered complete. Remaining payment and settlement operations can then be performed with a separate settlement system 130.

Processing of communications as part of a secure transaction and associated generation of the tokens and additional communications to facilitate modal presentation can occur in real-time or near real-time (e.g., limited by processing and network speeds and latency), such that computing devices facilitating communications and security operations automatically perform operations and provide information within a transaction that occurs within a brief time period (e.g., less than 0.1 seconds in some environments, less than 1 second in some environments, or less than 3 seconds in some environments). The near real-time operations and communications allows an account security system 140 to operate between a merchant system 108 and a client device 124 while minimally degrading the near real-time nature of communications for a transaction between client device 124 and merchant system 108, and improving device and system operation with added privacy and security. Further, in some implementations of real-time automatic operation, multiple instances of operations described above can occur simultaneously. For example, operation 306 for one transaction can occur simultaneously with any or every other operation of FIG. 3 for other transactions. Similarly, a single device implementing an account security system 140 can automatically perform multiple instances of each of operations 318, 330, and 338 for different transactions at the same time.

Figure 6:
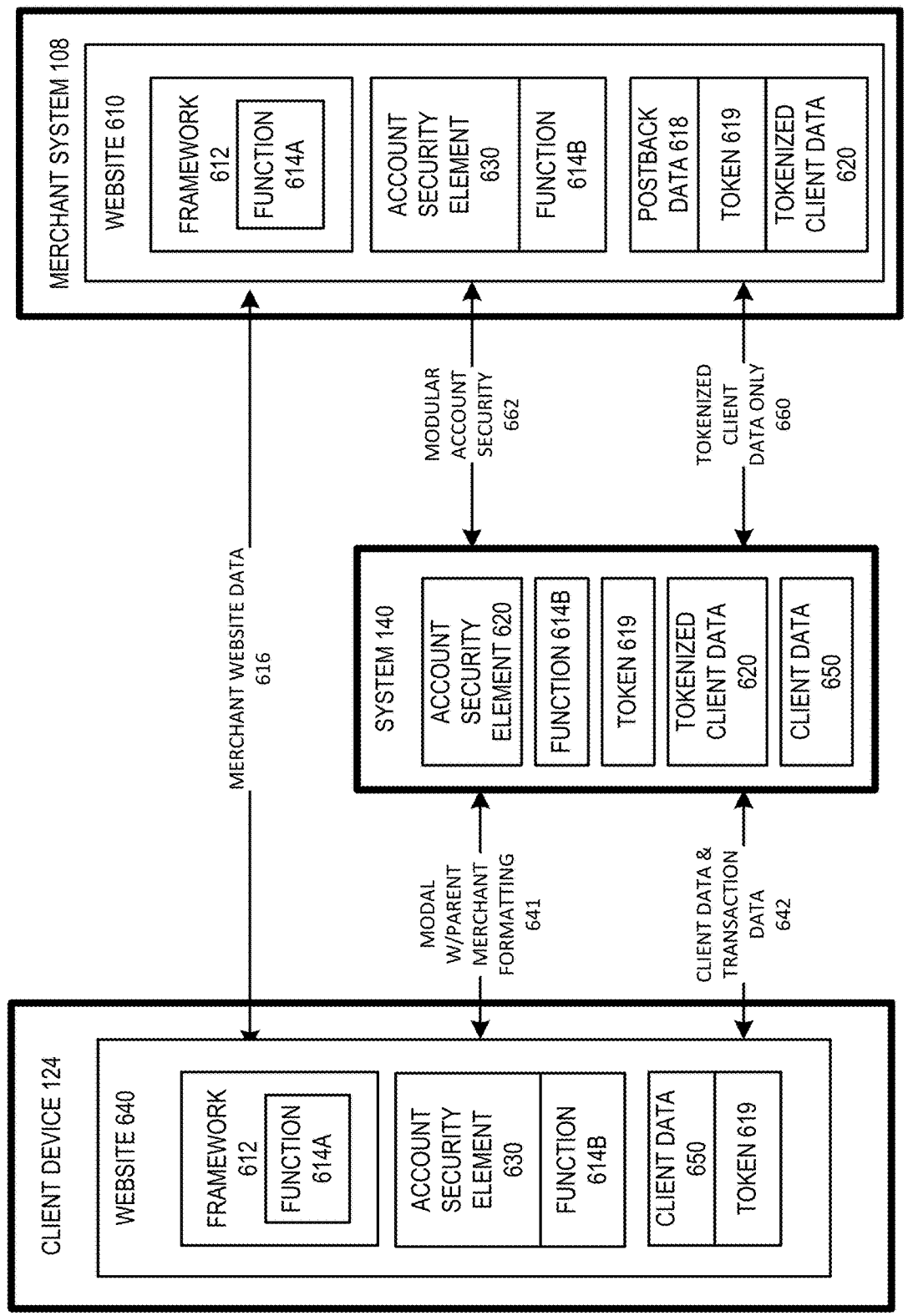
FIG. 6 depicts aspects of a system and system operations for data security and transaction management in accordance with some examples.

FIG. 6 depicts aspects of a system and system operations for data security and transaction management in accordance with some examples. FIG. 6 particularly shows how sensitive client data is isolated from merchant systems as well as how a given function can be used both with an initial website in a framework implementation as well as in an independent implementation through an account security element to support an account security system.

As illustrated, FIG. 6 shows client device 124, account security system 140, and merchant system 108 as part of a transaction network to allow data security as part of a transaction between a user associated with client device 124 and a merchant associated with merchant system 108. As shown, merchant system 108 includes a website 610 (e.g. instructions for implemented a networked website using one or more server computers or merchant devices). Merchant website data communication 616 includes website data to allow client device 124 to display a website 640 (e.g. a user interface and communications with merchant system 108 for website 610) on client device 124. This merchant website data communication 616 can include a framework 612 for implementing function 614A in support of website 610, as well as an account security element 630 for the client device that can also perform a version of the same function 614A, but implemented separately as function 614B to support system 140. The client device 124, merchant system 108, and account security system can each gain access to a client token 619 during an initial authentication that allows secure communications for a transaction when appropriate as part of the website 610 operation.

Client device 124 can include sensitive client data 650 provided by a client or user of the client device 124 which can be used for obtaining credit, authenticating a user, authorizing payment, or other such transaction functions. In the secure transaction illustrated above and in additional examples, communication 641 occurs via a modal implemented using account security element 630, which can then allow communications 641 with account security system 140 for client data and transaction data 642. This client data and transaction data 642 can include data for credit applications, credit account inquiries, credit account number lookup, as well as data authorization and payment settlement systems which can have access to sensitive client data 650. The merchant system 108, however, is isolated from this client data 650, so that merchant system 108 only receives tokenized client data 620 in communication(s) 660. This tokenized data received by merchant system 108 is secure, so that the tokenized data does not allow merchant system 108 access to or sensitive information associated with the client data used to generate the tokenized data. As described above, the tokenized client data 620 can be generated in system 140, and is generated to obscure the actual client data, while allowing the merchant system to interact with system 140 to facilitate payment and other secure interactions with client data. Additional account security communications 662 can include communications about information held by account security system 140, such as an account number lookup status, a tokenized account number status, a transaction status associated with a tokenized account number, a credit application associated with a tokenized client account number, or other such operations to provide merchant system 108 with status information for aspects of a transaction managed by system 140 while preventing merchant system 108 from having access to secure client data 650. In some examples, transaction status data, tokenized data, and any other such data from both website 640 operating on client device 124 and merchant system 108 can be stored as postback data 618 on merchant system 108. This postback data 618 can then be used to check a transaction status, confirm errors and delays in a transaction, associated a token 619 and tokenized client data 620 with a particular client device 124 and secure transaction with client device 124, or other such data management as part of a secure transaction.

The use of account security system 140 provides benefits to a system in which merchant system 108 and associated payment systems have fixed structures or implementations that would require significant resources or changes to implement the account lookup and account verification features. The use of account security system 140 enables such functionality with minor modular user interface changes by merchant system 108 website implementations, so that the security of the system 140 and communications with merchant system 108 are improved without these systems needing to be replaced. Implementing the account security element 630 with function 614B independently of framework 612 implementing the same function as function 614A allows system 140 to be integrated with the transaction and merchant system 108 while reducing overhead associated with support for multiple frameworks (e.g. instead of the single framework 612 for function 614) and simplifies the integration by avoiding conflicts that can arise with support for multiple instances of the same framework.

Similar to FIG. 3 above, FIG. 6 illustrates operations that can be implemented as real-time automatic operations, where multiple instances of operations described above can occur simultaneously. For example, a single device implementing merchant system 108 can automatically perform multiple (e.g., thousands of simultaneous) instances of each of the operations described in FIGS. 3 and 6 for different transactions at the same time.

Figure 7:
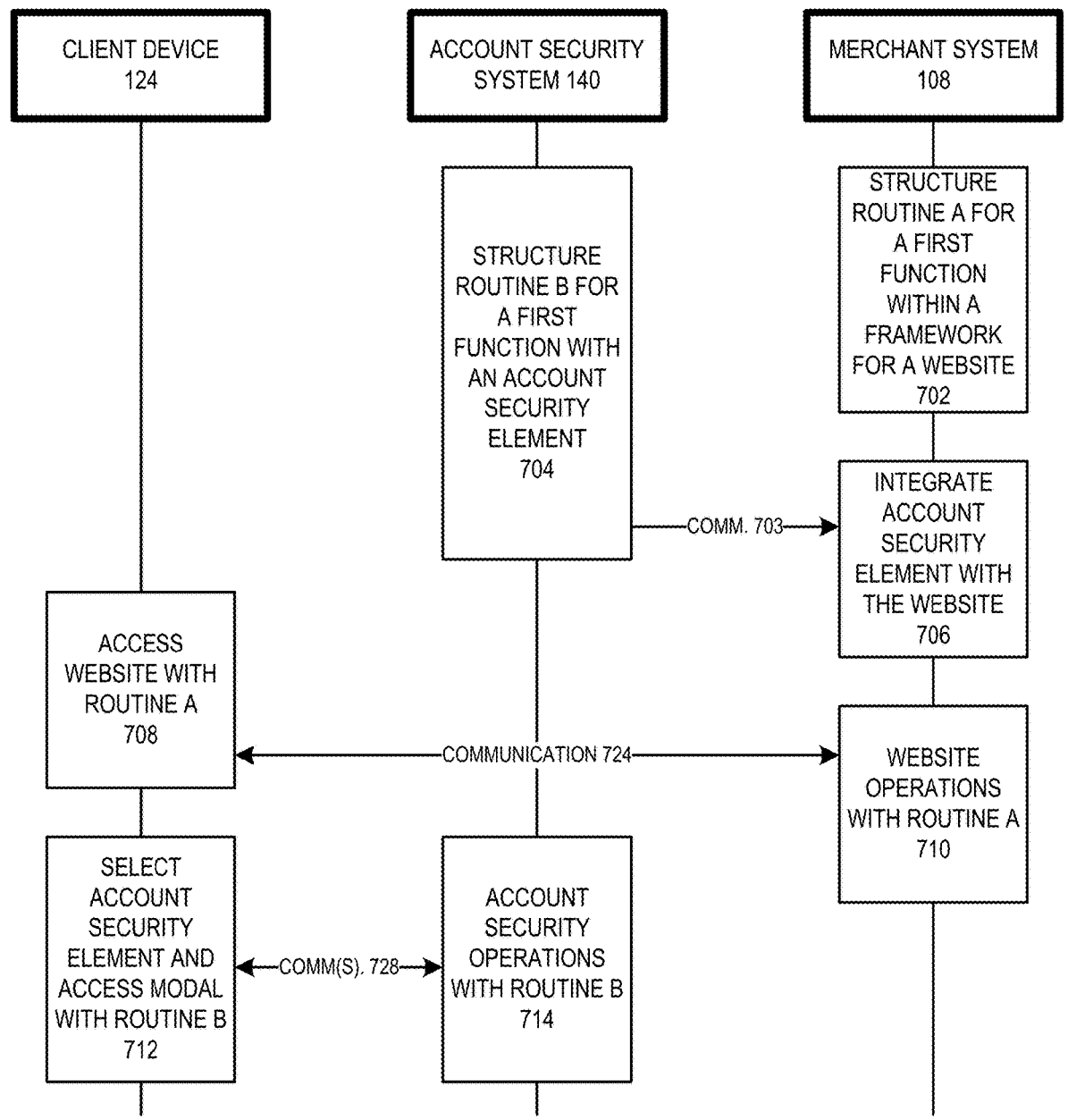
FIG. 7 depicts aspects of a system and system operations for data security and transaction management in accordance with some examples.

FIG. 7 illustrates onboarding operations for integrating an account security system 140 with a merchant system 108 in accordance with some embodiments, and use of a configured account security element for a transaction between merchant system 108 and client device 124.

In operation 702, a website is configured with a routine for a first function within a website. The routine is structured within a framework. Such frameworks can include, for example, "bootstrap.js", "jquery.js", or other JavaScript frameworks. In other examples, other frameworks can be used, or other framework structures for environments other than JavaScript can be used. In operation 704, the same from operation 702 is structured within an account security element as part of a routine (e.g. "routine B"). Routine B is different than routine A, and routine B is not structured within a framework. Any number of such functions can be structured to implement account security within a website operating as part of merchant system 108.

The account security element with routine B is generated as part of account security system 140, but is then communicated to merchant system 108 in communication(s) 703 and integrated with merchant system 108 in operations 706. Operations 706 can include onboarding configurations for a website of merchant system 108 and integration with any number of transaction features and security structures for account security system 140. The website at merchant system 108 uses routine A in operations 710 to implement the website which is accessed by client device 124 in communication(s) 724 and operations 708. As part of such operations, the account security element with routine B is communicated to client device 124 with website data. The client device performs operations for the initial website with merchant system 108 using routine A, but can then use the account security element with routine B to implement the modal secure communication(s) 728 with account security system 140 as part of operations 712 and operations 714. Operations as part of the website can be performed between client device 124 and merchant system 108 using routine A for the initial website operations, while routine B is used for the modal operations to enable interactions and functionality between client device 124 and account security system 140. In some examples, the function implemented by routines A and B can be asynchronous JavaScript and extensible markup language (AJAX) operations that can occur simultaneously or in a concurrent interleaved fashion (e.g. portions of operations occurring starting in a shared time frame and executed by a processor prior to either routine A or routine B ending, or routine A and routine B both starting prior to either routine ending). In other examples, the routines can implement other network communications, user interface formatting, access to common website formatting files or style structures, or other such functions within a transaction network or website system structure. Communications 324 and communications 328 can then be used to implement any account security operations or operations to facilitate a secure transaction as described herein. Asynchronous operations as described herein refer to operations that can operate simultaneously without blocking dependencies on other operations.

FIG. 8 is a flow diagram illustrating an example method 800. Method 800 can be performed by one or more processors of a server computer or server system as part of a merchant system interacting with an account security system (e.g. merchant system 108). Method 800 can, in some examples, be implemented as computer readable instructions that, when executed by processing circuitry of a device, cause the device to perform steps of method 800.

Operation 805 of method 800 involves accessing merchant website data for a merchant website including a framework, where the framework includes a first routine for a function. As described above, the function can be any set of operations to support a merchant website, including style sheet operations to support a standardized user interface, AJAX operations to support communications as part of a website, or other such operations. The routine can be software instructions that implement the function when executed by processors of server computers or computing machines.

Operation 810 of method 800 includes accessing an account security element for the merchant website. The account security element includes a second routine associated with an account security system for the function. The function is the same or a similar function to the function of operation 805, and where the second routine is optimized to avoid conflicts with the first routine when a user interface connected with the merchant system is operating on a client device concurrently. As described above, such operations and optimizations can include any set of operations where the first routine and the second routine begin operation (e.g. execution of parts of the routine on the device), where each routine begins prior to either routine ending (e.g. the first routine beginning, then the second routine beginning, then the first routine ending after the second routine begins). The second routine is operating as part of a connection for the client device with the account security system, which allows the account security system to be integrated with the website while avoiding conflicts with the initial website setup that uses the first routine. As described herein, optimizations to avoid conflicts can include adjustments to code or structure of a routine to prevent errors, including code testing and changes to the text or structure of the code in order to prevent problems, errors, conflicts, or other such issues during execution of the code by processors of a device.

Operation 815 involves automatically updating the framework to an updated framework, where the updated framework includes an updated first routine for the function. Such updates can occur, for example, when centralized revisions to a framework (e.g. managed by an independent framework server that is checked by the merchant system) result in a new version of the framework. As the first routine associated with the framework is updated, operation 820 involves maintaining the second routine for the function with no changes to the second routine. The second routine can be updated, but each routine is updated independently, and the independent structure (e.g. the second routine as part of a framework free structure for the function) avoids conflicts as updates occur. A separate update to the second routine allows error causing conflicts to be identified with the separate update rather than a more complex simultaneous update where error causing conflicts are less likely to be identified prior to updates being implemented in a live operating system.

Operation 825 then involves transmitting the merchant website data with the updated first routine and the account security element with the second routine, where the updated first routine and the second routine facilitate data security on the client device without framework conflicts when the updated first routine for the function and the second routine for the function operate concurrently on the client device. Additional operations then allow secure transactions as part of the merchant website environment.

Operation 830 then involves transmitting the merchant website data with the updated first routine and the account security element with the second routine, wherein the updated first routine and the second routine facilitate data security on the client device without framework conflicts when the updated first routine for the function and the second routine for the function operate concurrently on the client device. As described herein, various such operations can be configured to avoid framework conflicts by structuring operations and systems to support the operations without use of framework structures, or with framework structures specifically configured not to generate error causing conflicts or updates.

In some implementations, the checkout communication can be dynamically processed in real-time to improve the security of the system while maintaining quality of service (e.g., overall system responsiveness to client device 124 communications). An account security system 140 can perform automatic and real-time processing of checkout communications for many customers simultaneously (e.g., thousands of checkout communications per minute, thousands of checkout communications per second, or more depending on system configurations).

Some examples operate where the function includes an event handling operation or a style sheet configuration. Some examples operate where the second routine is part of a JavaScript named space styling library. Some examples operate where in the function includes an asynchronous background data communication structure for the merchant website. Event handling operations can include operations performed by code configured to initiate or perform actions in response to an event (e.g., an identified occurrence which results in an event identifier placed in a memory or device handling queue) during device operation.

Some examples further operate by receiving postback data generated by the first routine operating on the client device using the function while the second routine operates on the client device as part of a secure communication channel with the account security system.

Some examples operate by further accessing a second framework with the merchant website data for the merchant website including the second framework, and where the second framework includes a third routine for a second function. Some such examples operate by accessing a fourth routine with the account security element for the merchant web site, where the fourth routine is optimized to avoid conflicts with the third routine when the user interface connected with the merchant system is operating on the client device concurrently when the third routine is as part of a connection between the client device and the account security system, where the merchant website data is transmitted with the third routine and the fourth routine, where the updated first routine and the second routine facilitate data security on the client device without framework conflicts when the third routine for the second function and the fourth routine for the second function operate concurrently on the client device. As described herein, any number of functions can be duplicated in accordance with certain examples, in order to allow account security integration with a merchant website while avoiding conflicts between functions used by both the initial website and the account security systems integrated with the website.

Such examples can further process communications automatically (e.g., without human intervention) at high volume in real-time or near real-time (e.g., thousands of communications per second or per fraction of a second in some implementations).

FIG. 9 is a flow diagram illustrating an example method 900. Method 900 can be performed by one or more processors of a server computer or server system as part of a client device interacting with a merchant system and an account security system (e.g. client device 124). Method 900 can, in some examples, be implemented as computer readable instructions that, when executed by processing circuitry of a device, cause the device to perform steps of method 900.

Method 900 beings with operation 905 receiving website data including a framework and an account security element for a merchant website, wherein the framework includes a first routine associated with a merchant system for a function, and wherein the account security element includes a second routine associated with an account security system for the function. Operation 910 of method 900 then involves generating a user interface for the merchant website using the first routine.

Operation 915 of method 900 involves receiving input corresponding to a selection of the account security element of the user interface, wherein the account security element is associated with the account security system. Operation 920 involves generating a modal, wherein the modal is generated in response to the input, and wherein the modal facilitates establishing a secure connection with the account security system.

Operation 925 involves transmitting postback data using the first routine for the function, wherein the postback data is stored by the merchant system as part of the merchant web site. Operation 930 involves establishing a secure communication channel with the account security system using the second routine for the function, where the secure communication channel facilitates data security for client data as part of a secure transaction.

Some examples involve automatically updating the framework to an updated framework, wherein the updated framework includes an updated first routine for the function and maintaining the second routine for the function with no changes to the second routine.

These operations can, in various examples, be integrated with other operations for account security and operation of an account security system as described herein. In some examples, methods 800 and 900 are complementary operations performed by devices in the same network. In some examples, operations described above can be repeated, can include intervening operations, or can be performed concurrently for any number of secure transactions between different merchant systems and client devices. It will therefore be apparent that while methods 800 and 900 describe example implementations, other implementations are also possible in accordance with the details provided herein.

In various implementations some or all of the operations described above can be performed in real-time or near real-time. The real-time operations can include some or all of the operations 905 through 930 of method 900. Such automatic operations improve a system by enabling real-time or near real-time transactions with latencies and responsiveness in automatic operations not possible when operations involve human interaction (e.g., non-automatic operation). Additionally, operations can occur simultaneously as part of a single system processing multiple transactions, such that the generating operation 910 for a first transaction can occur simultaneously with the generating operation 920 for another transaction. Similarly, communications for other transactions can be in process while such generating operations occur as part of operations facilitated by a single device or a system that includes one or more devices configured to implement method 900 or other operations described herein. For example, the operations described above can be performed automatically by an account security system 140 in a network, without human interaction as part of the account security system 140 operations.

Similarly, merchant system 108 and client device 124 can perform certain operations automatically (e.g., without human interaction or involvement). For example, a client device 124 can receive a non-automatic input (e.g., involving a human interaction with client device 124), which initiates a chain of automatic operations at merchant system 108, account security system 140, and client device 124 without further human involvement (e.g., automatic operations flowing from an initial non-automatic operation triggered by a human input at an interface of client device 124). Such automatic operations improve a system by enabling real-time or near real-time transactions with latencies and responsiveness in automatic operations not possible when operations involve human interaction (e.g., non-automatic operation).

Figure 10:
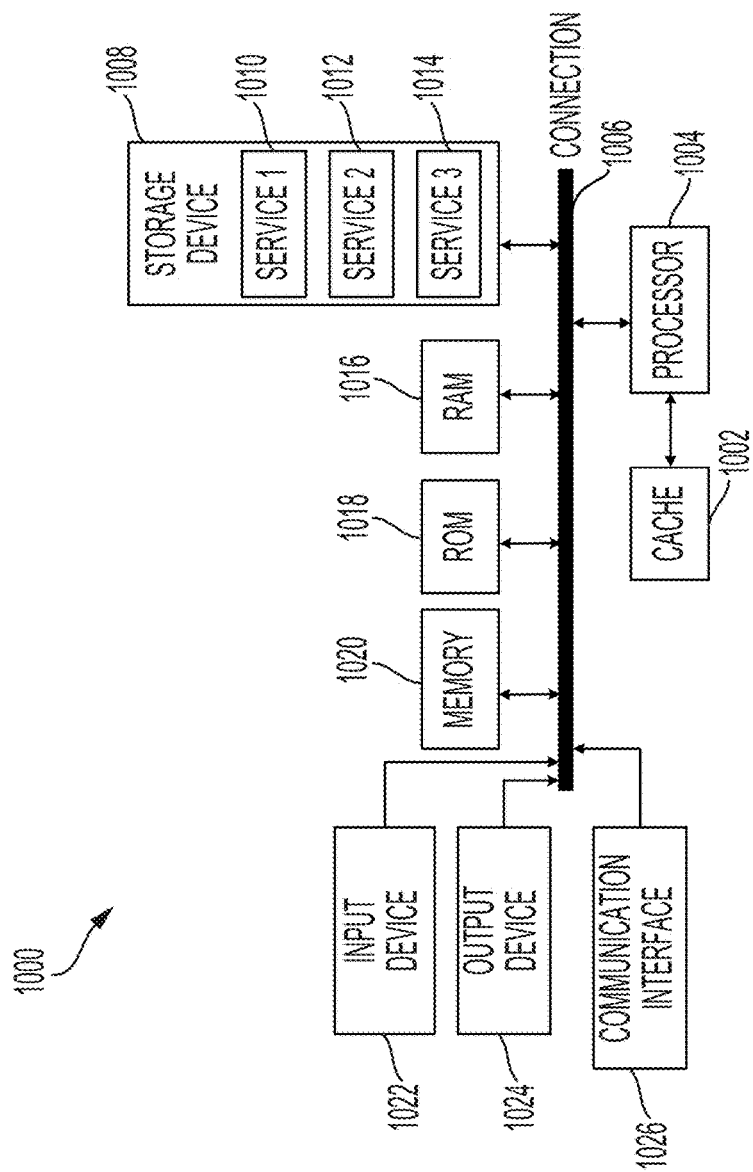
FIG. 10 shows a computing system architecture including various components in electrical communication with each other using a connection in accordance with various examples.

FIG. 10 illustrates a computing system architecture 1000 including various components in electrical communication with each other using a connection 1006, such as a bus, in accordance with some implementations. Example system architecture 1000 includes a processing unit (CPU or processor) 1004 and a system connection 1006 that couples various system components including the system memory 1020, such as ROM 1018 and RAM 1016, to the processor 1004. The system architecture 1000 can include a cache 1002 of high-speed memory connected directly with, in close proximity to, or integrated as part of the processor 1004. The system architecture 1000 can copy data from the memory 1020 and/or the storage device 1008 to the cache 1002 for quick access by the processor 1004. In this way, the cache can provide a performance boost that avoids processor 1004 delays while waiting for data. These and other modules can control or be configured to control the processor 1004 to perform various actions.

Other system memory 1020 may be available for use as well. The memory 1020 can include multiple different types of memory with different performance characteristics. The processor 1004 can include any general purpose processor and a hardware or software service, such as service 1 1010, service 2 1012, and service 3 1014 stored in storage device 1008, configured to control the processor 1004 as well as a special-purpose processor where software instructions are incorporated into the actual processor design. The processor 1004 may be a completely self-contained computing system, containing multiple cores or processors, a bus, memory controller, cache, etc. A multi-core processor may be symmetric or asymmetric.

To enable user interaction with the computing system architecture 1000, an input device 1022 can represent any number of input mechanisms, such as a microphone for speech, a touch-sensitive screen for gesture or graphical input, keyboard, mouse, motion input, speech and so forth. An output device 1024 can also be one or more of a number of output mechanisms known to those of skill in the art. In some instances, multimodal systems can enable a user to provide multiple types of input to communicate with the computing system architecture 1000. The communications interface 1026 can generally govern and manage the user input and system output. There is no restriction on operating on any particular hardware arrangement and therefore the basic features here may easily be substituted for improved hardware or firmware arrangements as they are developed.

Storage device 1008 is a non-volatile memory and can be a hard disk or other types of computer readable media which can store data that are accessible by a computer, such as magnetic cassettes, flash memory cards, solid state memory devices, digital versatile disks, cartridges, RAMs 1016, ROM 1018, and hybrids thereof.

The storage device 1008 can include services 1010, 1012, 1014 for controlling the processor 1004. Other hardware or software modules are contemplated. The storage device 1008 can be connected to the system connection 1006. In one aspect, a hardware module that performs a particular function can include the software component stored in a computer-readable medium in connection with the necessary hardware components, such as the processor 1004, connection 1006, output device 1024, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included (e.g. in FIG. 8). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer implemented method, comprising:
   accessing, by a merchant system comprising one or more processors, merchant website data for a merchant web site including a framework, and wherein the framework includes a first routine for a function;
   accessing an account security element for the merchant website, wherein the account security element includes a second routine associated with an account security system for the function, and wherein the second routine is optimized to avoid conflicts with the first routine by specifically configuring the second routine to not generate error causing conflicts or updates due to the first routine of the framework implementation of the function when a user interface connected with the merchant system is operating on a client device concurrently when the second routine is operating as part of a connection for the client device with the account security system;
   automatically updating the framework to an updated framework, wherein the updated framework includes an updated first routine for the function;
   maintaining the second routine for the function with no changes to the second routine; and
   transmitting the merchant web site data with the updated first routine and the account security element with the second routine, wherein the updated first routine and the second routine facilitate data security on the client device without framework conflicts when the updated first routine for the function and the second routine for the function operate concurrently on the client device.

2. The computer implemented method of claim 1, wherein the function includes an event handling operation or a style sheet configuration.

3. The computer implemented method of claim 1, wherein the second routine is part of a JavaScript named space styling library.

4. The computer implemented method of claim 1, wherein the function includes an asynchronous background data communication structure for the merchant website.

5. The computer implemented method of claim 1 further comprising:
   receiving postback data generated by the first routine operating on the client device using the function while the second routine operates on the client device as part of a secure communication channel with the account security system.

6. The computer implemented method of claim 1, wherein the merchant website data includes a second framework with a third routine for a second function; and
   wherein the account security element includes a fourth routine for the second function.

7. The computer implemented method of claim 1, wherein the merchant website data includes a second framework with a third routine for a second function; and
   wherein the second function is an asynchronous JavaScript and Extensible Markup Language function.

8. A system comprising:
   one or more processors; and
   one or more non-transitory machine-readable storage media containing instructions that,
   when executed on the one or more processors, cause the one or more processors to perform operations including:
   accessing merchant website data for a merchant website of a merchant system including a framework, and wherein the framework includes a first routine for a function;
   accessing an account security element for the merchant website, wherein the account security element includes a second routine associated with an account security system for the function, and wherein the second routine is optimized to avoid conflicts with the first routine by specifically configuring the second routine to not generate error causing conflicts or updates due to the first routine of the framework implementation of the function when a user interface connected with the merchant system is operating on a client device concurrently when the second routine is operating as part of a connection for the client device with the account security system;
   automatically updating the framework to an updated framework, wherein the updated framework includes an updated first routine for the function;
   maintaining the second routine for the function with no changes to the second routine; and
   transmitting the merchant web site data with the updated first routine and the account security element with the second routine, wherein the updated first routine and the second routine facilitate data security on the client device without framework conflicts when the updated first routine for the function and the second routine for the function operate concurrently on the client device.

9. The system of claim 8, wherein the function includes an event handling operation or a style sheet configuration.

10. The system of claim 8, wherein the second routine is part of a JavaScript named space styling library.

11. The system of claim 8, wherein the function includes an asynchronous background data communication structure for the merchant website.

12. The system of claim 8 further comprising:
receiving postback data generated by the first routine operating on the client device using the function while the second routine operates on the client device as part of a secure communication channel with the account security system.

13. The system of claim 8, wherein the merchant web site data includes a second framework with a third routine for a second function; and
wherein the account security element includes a fourth routine for the second function.

14. The system of claim 8, wherein the merchant web site data includes a second framework with a third routine for a second function; and
wherein the second function is an asynchronous JavaScript and Extensible Markup Language function.

15. A non-transitory computer readable medium comprising instructions that, when executed by one or more processors of a device, cause the device to perform operations comprising:
accessing merchant web site data for a merchant web site of a merchant system including a framework, and wherein the framework includes a first routine for a function;
accessing an account security element for the merchant website, wherein the account security element includes a second routine associated with an account security system for the function, and wherein the second routine is optimized to avoid conflicts with the first routine by specifically configuring the second routine to not generate error causing conflicts or updates due to the first routine of the framework implementation of the function when a user interface connected with the merchant system is operating on a client device concurrently when the second routine is operating as part of a connection for the client device with the account security system;
automatically updating the framework to an updated framework, wherein the updated framework includes an updated first routine for the function;
maintaining the second routine for the function with no changes to the second routine; and
transmitting the merchant web site data with the updated first routine and the account security element with the second routine, wherein the updated first routine and the second routine facilitate data security on the client device without framework conflicts when the updated first routine for the function and the second routine for the function operate concurrently on the client device.

16. The non-transitory computer readable medium of claim 15, wherein the function includes an event handling operation or a style sheet configuration.

17. The non-transitory computer readable medium of claim 15, wherein the second routine is part of a JavaScript named space styling library.

18. The non-transitory computer readable medium of claim 15, wherein the function includes an asynchronous background data communication structure for the merchant website.

19. The non-transitory computer readable medium of claim 15 wherein the instructions further cause the device to perform operations including:
receiving postback data generated by the first routine operating on the client device using the function while the second routine operates on the client device as part of a secure communication channel with the account security system.

20. The non-transitory computer readable medium of claim 15, wherein the merchant website data includes a second framework with a third routine for a second function; and
wherein the account security element includes a fourth routine for the second function.

21. The non-transitory computer readable medium of claim 15, wherein the merchant website data includes a second framework with a third routine for a second function; and
wherein the second function is an asynchronous JavaScript and Extensible Markup Language function.

* * * * *